United States Patent
Cannazza et al.

(10) Patent No.: US 12,491,452 B2
(45) Date of Patent: Dec. 9, 2025

(54) EXTRACTION METHOD AND COMPOSITION OBTAINED THEREFROM

(71) Applicant: NATURALIA INGREDIENTS S.R.L., Mazara del Vallo (IT)

(72) Inventors: Giuseppe Cannazza, Bologna (IT); Cinzia Citti, Corigliano d'Otranto (IT); Flavio Forni, Modena (IT); Maria Angela Vandelli, Sassuolo (IT)

(73) Assignee: NATURALIA INGREDIENTS S.R.L. (IT)

( * ) Notice: Subject to any disclaimer, the term of this patent is extended or adjusted under 35 U.S.C. 154(b) by 1186 days.

(21) Appl. No.: 17/311,735

(22) PCT Filed: Dec. 11, 2019

(86) PCT No.: PCT/IB2019/060663
§ 371 (c)(1),
(2) Date: Jun. 8, 2021

(87) PCT Pub. No.: WO2020/121218
PCT Pub. Date: Jun. 18, 2020

(65) Prior Publication Data
US 2022/0023771 A1 Jan. 27, 2022

(30) Foreign Application Priority Data
Dec. 11, 2018 (IT) .................. 102018000010978

(51) Int. Cl.
*A23L 33/105* (2016.01)
*A61K 31/00* (2006.01)
*A61K 36/185* (2006.01)
*B01D 11/02* (2006.01)

(52) U.S. Cl.
CPC ........ *B01D 11/0288* (2013.01); *A23L 33/105* (2016.08); *A61K 31/658* (2023.05); *A61K 36/185* (2013.01); *A61K 2236/30* (2013.01)

(58) Field of Classification Search
None
See application file for complete search history.

(56) References Cited

U.S. PATENT DOCUMENTS

| 9,408,417 | B2 | 8/2016 | O'Connell |
| 9,765,000 | B2 | 9/2017 | Nadal Roura |
| 2017/0340562 | A9 | 11/2017 | Glatzel |
| 2019/0231833 | A1 | 8/2019 | Garti et al. |

FOREIGN PATENT DOCUMENTS

| CN | 1688290 A | 10/2005 | |
| CN | 1691954 A | 11/2005 | |
| CN | 103167871 A | 6/2013 | |
| CN | 105764504 A | 7/2016 | |
| CN | 107567435 A | 1/2018 | |
| CN | 108310799 A | 7/2018 | |
| JP | 2017158524 | * 9/2017 | |
| MA | 37112 | 1/2016 | |
| WO | WO-2016133824 A1 | * 8/2016 | ............. A61K 31/05 |
| WO | WO-2017180953 A1 | * 10/2017 | ........... A23D 7/0053 |
| WO | 2018152334 A | 8/2018 | |

OTHER PUBLICATIONS

Wang, et al. (Cannabis and Cannabinoid Research 2016, 1.1 http://online.liebertpub.com/doi/10.1089/can.2016.0020, retrieved on Nov. 18, 2024) (Year: 2016).*
Pekka Jarho et al., Hydroxypropyl-beta-cyclodextrin and its combination with hydroxypropyl-methylcellulose increases aqueous solubility of tetrahydrocannabinol; Life Sciences, Pergamon Press, Oxford, GB. vol. 63, No. 26, Jan. 1, 1998 (Jan. 1, 1998), pp. 381-384.
Arno Hazekamp, Cannabis; extracting the medicine, Sep. 5, 2007 (Sep. 5, 2007), pp. 1-187; Retrieved on Aug. 16, 2016.
Chinese Office Action 2019800825202 Issued Aug. 29, 2022.

* cited by examiner

*Primary Examiner* — John S Kenyon
*Assistant Examiner* — Rehana Ismail
(74) *Attorney, Agent, or Firm* — The Belles Group, P.C.

(57) ABSTRACT

Extraction method comprising an extraction step, during which a plant substrate is caused to come into contact with an aqueous liquid so that cannabinoids are extracted from the plant substrate and carried to the aqueous liquid; the aqueous liquid comprises at least 40% by weight, relative to the total weight of the aqueous liquid, of water and a complexing component; the complexing component is at least one cyclodextrin; the composition obtained is surprisingly stable and the cannabinoids extracted, in particular the acid cannabinoids, which are normally unstable, can be conserved for long periods of time.

21 Claims, No Drawings

EXTRACTION METHOD AND COMPOSITION OBTAINED THEREFROM

CROSS-REFERENCE TO RELATED APPLICATIONS

This Patent Application is a U.S. national stage application under 35 U.S.C. § 371 of PCT Application No. PCT/IB2019/060663, filed Dec. 11, 2019, which claims priority from Italian Patent Application No. 102018000010978 filed Dec. 11, 2018, the entire disclosure of the aforementioned priority applications are incorporated herein by reference in their entireties.

TECHNICAL FIELD

The present invention relates to an extraction method, a composition and uses thereof.

BACKGROUND OF THE INVENTION

*Cannabis sativa* L. (CS) is a dioecious annual plant belonging to the Cannabaceae family, known from the earliest times for its varied applications, from the production of oils and fibers to its use for recreational and therapeutic purposes.

In fact, CS is currently used in the clinical field for the treatment of various pathologies such as arthritis, multiple sclerosis, epilepsy, neuropathic pain, sleep disorders, inappetence in patients with HIV/AIDS, nausea and vomiting due to chemotherapy, etc. The use of CS in the therapeutic field is essentially due to the pharmacological action of a particular class of compounds called phytocannabinoids, having a terpenophenolic molecular structure. Said pharmacological action can be ascribed to the bond of these cannabinoids with specific receptors present in mammals, birds, fish and reptiles, called endocannabinoid receptors, since they are predisposed to bind endogenous cannabinoids such as 2-acylglycerol and anandamide.

Each of the phytocannabinoids has a different pharmacological profile. Up to now over 140 cannabinoids have been identified, of which the best-known are (−)-trans-delta-9-tetrahydrocannabinol (THC) ((6aR,10aR)-6a,7,8,10a-Tetrahydro-6,6,9-trimethyl-3-pentyl-6H-dibenzo[b,d]pyran-1-ol, CAS no. 1972-08-3), responsible for the psychotropic activity of the plant; the cannabidiol (CBD) (2-[(1R,6R)-3-methyl-6-(prop-1-en-2-yl)cyclohex-2-enyl]-5-pentylbenzene-1,3-diol, CAS no.: 13956-29-1), on the other hand, is not psychotropic but has analgesic, anti-inflammatory, anticonvulsant and antioxidant properties.

Other cannabinoids are Delta-8-THC, (delta-8-THC) ((6aR,10aR)-6a,7,10,10a-Tetrahydro-6,6,9-trimethyl-3-pentyl-6H-dibenzo[b,d]pyran-1-ol, CAS no. 5957-75-5); cannabinol (CBN) (6,6,9-Trimethyl-3-pentyl-benzo[c]chromen-1-ol, CAS no. 521-35-7); cannabigerol (CBG) (2-[(2E)-3,7-Dimethylocta-2,6-dienyl]-5-pentyl-benzene-1,3-diol, CAS no. 25654-31-3); cannabidivarin (CBDV) (2-((1S,6S)-3-methyl-6-(prop-1-en-2-yl)cyclohex-2-enyl)-5-propylbenzene-1,3-diol, CAS no. 24274-48-4); tetrahydrocannabivarin (THCV) ((6aR,10aR)-6a,7,8,10a-Tetrahydro-6,6,9-trimethyl-3-propyl-6H-dibenzo[b,d]pyran-1-ol, CAS no. 28172-17-0); cannabichromene (CBC) (2-Methyl-2-(4-methyl-3-penten-1-yl)-7-pentyl-2H-1-benzopyran-5-ol, CAS no. 20675-51-8); cannabivarin (CBV) (6,6,9-Trimethyl-3-propyl-6H-dibenzo[b,d]pyran-1-ol, CAS no. 33745-21-0); cannabigerovarin (CBGV) (2-[(2E)-3,7-Dimethyl-2,6-octadien-1-yl]-5-propyl-1,3-benzenediol, CAS no. 55824-11-8), etc.

That being said, ese cannabinoids are not directly synthesized by the plant; the latter instead enzymatically produces the corresponding acid forms, in which the acid function is bound to the aromatic ring in position α relative to the hydroxyl, such as tetrahydrocannabinolic acid (THCA) ((6aR,10aR)-1-hydroxy-6,6,9-trimethyl-3-pentyl-6a,7,8,10a-tetrahydro-6H-benzo[c]chromene-2-carboxylic acid, CAS no. 547-98-8); cannabidiolic acid (CBDA) (2,4-Dihydroxy-3-[(1R,6R)-3-methyl-6-(1-methylethenyl)-2-cyclohexen-1-yl]-6-pentylbenzoic acid, CAS no. 1244-58-2); cannabigerolic acid (CBGA) (3-[(2E)-3,7-Dimethyl-2,6-octadien-1-yl]-2,4-dihydroxy-6-pentylbenzoic acid, CAS no. 25555-57-1); cannabichromenic acid (CBCA) ((+)-5-hydroxy-2-methyl-2-(4-methyl-3-penten-1-yl)-7-pentyl-2H-1-benzopyran-6-carboxylic acid, CAS no. 20408-52-0); cannabidivarinic acid (CBDVA) (2,4-Dihydroxy-3-[(1R,6R)-3-methyl-6-(1-methylethenyl)-2-cyclohexen-1-yl]-6-propylbenzoic acid, CAS no. 31932-13-5); tetrahydrocannabivarinic acid (THCVA) ((6aR,10aR)-6a,7,8,10a-Tetrahydro-1-hydroxy-6,6,9-trimethyl-3-propyl-6H-dibenzo[b,d]pyran-2-carboxylic acid, CAS no. 39986-26-0); cannabivarinic acid (CBVA) (1-hydroxy-6,6,9-trimethyl-3-propyl-6H-Dibenzo[b,d]pyran-2-carboxylic acid, CAS no. 64846-02-2); cannabinolic acid (CBNA) (1-hydroxy-6,6,9-trimethyl-3-pentyl-6H-dibenzo[b,d]pyran-2-carboxylic acid, CAS no. 2808-39-1); Delta-8-THCA (delta-8-THCA) ((6aR,10aR)-6a,7,10,10a-Tetrahydro-1-hydroxy-6,6,9-trimethyl-3-pentyl-6H-dibenzo[b,d]pyran-2-carboxylic acid, CAS no. 23978-89-4); cannabigerovarinic acid (CBGVA) (3-[(2E)-3,7-Dimethyl-2,6-octadien-1-yl]-2,4-dihydroxy-6-propylbenzoic acid, CAS no. 64924-07-8) etc.

Light and mainly heat trigger a decarboxylation reaction resulting in formation of the corresponding phytocannabinoids in neutral (non-carboxylated) form.

According to the percentage of psychotropic cannabinoids within the inflorescence, CS is used for therapeutic or recreational purposes (drug-type with high THC content) or for the production of seeds and fibers (fiber-type with very low THC content, such as not to produce psychotropic effects). The seeds are for the most part used in the food industry, for example for the production of flour and oil. The fibers can be used for various purposes, for example for the production of textile, plastic, paper and combustible material, for infrastructures, etc. The cannabinoids are produced by the plant in particular structures called trichomes (similar to hairs) found on female flowers. However, cannabinoids can also be found in small percentages in other parts of the plant.

Currently, oily or alcoholic inflorescence extracts of CS are prepared for the production of medicines for the treatment of numerous pathologies. Oily or alcoholic preparations are used because cannabinoids are insoluble in water. Although *cannabis*-based tisane is a very common method of administration, its cannabinoid extraction capacity is very poor. There are also numerous drugs based on single cannabinoids or mixtures of two of them (more commonly THC and CBD). For example, the German Pharmacopoeia contains in its formulary an oily solution in medium chain triglyceride oil (MCT oils) of cannabidiol 50 mg/mL for use as oral drops [DAC/NRF 2015/2, Ölige Cannabidiol-Lösung 50 mg/mL (NRF 22.10)].

One of the drawbacks that characterizes the oily and alcoholic extracts is the instability of the cannabinoids in said excipients, especially as regards the acid forms. As recently observed by Citti et al. [Citti et al. Journal of Pharmaceutical and Biomedical Analysis, 2016, 128, 201-209], greater stability can be obtained for ten days if the pharmaceutical product is kept at a temperature of 4-8° C. However, the stability of the preparation is not guaranteed for a longer period of time. Furthermore, the CS extract oily-based oral solutions are not liked by patients due to the feeling of oil in the mouth, in particular when they are used in children. On the other hand, alcohol-based oral solutions can have side effects due to the ethanol. In particular the use of ethanol in children is not advisable.

Furthermore, it should be taken into account that cannabinoid preparations for oral administration lead to a poor bioavailability of these active ingredients due both to their poor absorption and to a significant first-pass effect [M. A. Huestis, Human Cannabinoid Pharmacokinetics, Chem Biodivers. 2007, 4 (8), 1770-1804].

The need is therefore felt for formulations that allow long conservation and simple and effective administration of CS active ingredients. Alongside this is the need for a preparation method of these formulations which is equally simple, implementable, safe and inexpensive.

The object of the present invention is to provide an extraction method, a composition and uses thereof which overcome, at least partially, the drawbacks of the known art and at the same time are easy and inexpensive to produce.

SUMMARY

According to the present invention, an extraction method, a composition and uses thereof are provided as claimed in the following independent claims and, preferably, in any one of the claims depending directly or indirectly on the independent claims.

EMBODIMENTS OF THE INVENTION

In accordance with a first aspect of the present invention, an extraction method is provided comprising an extraction step, during which a plant substrate is caused to come into contact with an aqueous liquid (i.e. containing water) so that at least one cannabinoid is extracted from the plant substrate and carried to the aqueous liquid component (so as to obtain a composition). The aqueous liquid comprises at least 40% by weight, relative to the total weight of the aqueous liquid, of water and at least one complexing component, which comprises (in particular, is) at least one cyclodextrin (CD).

In particular, the composition (obtained) comprises at least 40% by weight, relative to the total weight of the aqueous liquid, of water, the complexing component and the cannabinoid.

The method in accordance with the present invention has enabled the extraction of one or more cannabinoids with great efficiency and in an extremely simple and rapid manner. The results obtained (see also the examples below, which show that the method is able to perform a substantially complete extraction) were surprising and could not have been predicted.

Following the carried out experiments, it was hypothesized that cyclodextrin can form host-guest type inclusion complexes with the cannabinoids due to the formation of non-covalent bonds with molecules or parts of lipophilic molecules (cannabinoids) inside the cavity of the CDs. Surprisingly, the formation of the inclusion complex leads to a change both in the solubility of the guest molecules (cannabinoids) and in their stability with regard to light, oxygen and reactivity with regard to chemical agents.

In some non-limiting cases, the cannabinoid extracted is a single cannabinoid (e.g. CBDA or THCA). Alternatively (and preferably), the cannabinoid extracted is a mixture of cannabinoids.

In particular, the cannabinoid is one or more phytocannabinoids (having a terpenophenolic molecular structure).

According to some non-limiting embodiments, the cannabinoid that is extracted from the plant substrate during the extraction step is chosen from the group consisting of: CBD, THC, Delta-8-THC, CBN, CBDA, THCA, CBG, CBGA, CBC, CBCA, CBDV, THCV, CBV, CBGV, CBDVA, THCVA, Delta-8-THCA, CBNA, CBVA, CBGVA (and a combination thereof—i.e. a mixture thereof).

In other words, during the extraction step, at least one cannabinoid chosen from the group consisting of: CBD, THC, Delta-8-THC, CBN, CBDA, THCA, CBG, CBGA, CBC, CBCA, CBDV, THCV, CBV, CBGV, CBGVA, CBDVA, THCVA, Delta-8-THCA, CBNA, CBVA, CBGVA (and a combination thereof—i.e. a mixture thereof) is extracted from the plant substrate and carried to the aqueous liquid.

In particular, during the extraction step, at least one cannabinoid chosen from the group consisting of: CBD, THC, CBDA, THCA, CBG, CBGA, CBC, CBCA, CBDV, THCV, CBDVA, THCVA (and a combination thereof—i.e. a mixture thereof) is extracted from the plant substrate and carried to the aqueous liquid.

Advantageously but not necessarily, during the extraction step, at least the following cannabinoids are extracted from the plant substrate and carried to the aqueous liquid: CBD, THC, CBDA, THCA, CBG, CBC, CBCA, CBDV, THCV, CBDVA, THCVA.

In particular, during the extraction step, at least the following cannabinoids are extracted from the plant substrate and carried to the aqueous liquid: CBD, THC, CBN, CBDA, THCA, CBG, CBGA, CBC, CBCA, CBDV, THCV, CBGVA, CBDVA, THCVA, CBNA, CBVA.

More in particular, during the extraction step, at least the following cannabinoids are extracted from the plant substrate and carried to the aqueous liquid: CBD, THC, CBN, CBDA, THCA, CBG, CBGA, CBC, CBCA, CBDV, THCV, CBV, CBGV, CBGVA, CBDVA, THCVA, CBNA, CBVA.

Even more in particular, during the extraction step, at least the following cannabinoids are extracted from the plant substrate and carried to the aqueous liquid: CBD, THC, Delta-8-THC, CBN, CBDA, THCA, CBG, CBGA, CBC, CBCA, CBDV, THCV, CBV, CBGV, CBDVA, THCVA, Delta-8-THCA, CBNA, CBVA.

According to some non-limiting embodiments, during the extraction step, at least the following cannabinoids are extracted from the plant substrate and carried to the aqueous liquid: CBD, THC, CBDA and THCA.

On the other hand, other known cannabinoids can be extracted alone or in a mixture [L. O. Hanus, S. M. Meyer, E. Munoz, O. Taglialatela-Scafati, G. Appendino, Phytocannabinoids: A unified critical inventory, Natural Product Reports, 2016, 33(12), 1357-1392].

According to specific embodiments, during the extraction step at least the (part of the) cannabinoids cited in L. O. Hanus, S. M. Meyer, E. Munoz, O. Taglialatela-Scafati, G. Appendino, Phytocannabinoids: A unified critical inventory, Natural Product Reports, 2016, 33(12), 1357-1392 are extracted.

In this way it is possible to obtain a composition containing several cannabinoids and therefore able to guarantee the benefits of their synergic action.

More precisely, during the extraction step, all the (relevant organic) substances contained are extracted. In this way, the synergic effects of the different components are even more guaranteed.

In particular, the cannabinoid that is extracted and carried to the aqueous liquid during the extraction step comprises (more in particular, is) an acid (carboxylated) cannabinoid.

In other words, during the extraction step, at least one acid (carboxylated) cannabinoid is extracted and carried to the aqueous liquid.

It is to be noted that this point is by no means a foregone conclusion. In this regard, it should be remembered that the acid cannabinoids are less stable than their non-acid homologues and that often, using the known extraction methods, they are degraded.

In some non-limiting cases, the acid cannabinoid extracted is a single cannabinoid. Alternatively (and preferably), the acid cannabinoid extracted is a mixture of acid cannabinoids.

According to some non-limiting embodiments, during the extraction step at least one acid (carboxylated) cannabinoid identified in L. O. Hanus, S. M. Meyer, E. Munoz, O. Taglialatela-Scafati, G. Appendino, Phytocannabinoids: A unified critical inventory, Natural Product Reports, 2016, 33(12), 1357-1392, is extracted.

According to specific non-limiting embodiments, the acid cannabinoid is chosen from the group consisting of: CBDA, THCA, CBGVA, CBGA, CBCA, CBDVA, THCVA, Delta-8-THCA, CBNA, CBVA (and a combination thereof—i.e. a mixture thereof). In other words, during the extraction step (at least) one cannabinoid chosen from the group consisting of: CBDA, THCA, CBGVA, CBGA, CBCA, CBDVA, THCVA, Delta-8-THCA, CBNA, CBVA (and a combination thereof—i.e. a mixture thereof) is extracted from the plant substrate and carried to the aqueous liquid.

In particular, during the extraction step (at least) one cannabinoid chosen from the group consisting of: CBDA, THCA, CBGVA, CBGA, CBCA, CBDVA, THCVA, CBNA, CBVA (and a combination thereof—i.e. a mixture thereof) is extracted from the plant substrate and carried to the aqueous liquid.

More in particular, during the extraction step (at least) one cannabinoid chosen from the group consisting of: CBDA, THCA, CBGA, CBCA, CBDVA, THCVA, CBNA (and a combination thereof—i.e. a mixture thereof) is extracted from the plant substrate and carried to the aqueous liquid.

Even more in particular, during the extraction step (at least) THCA and/or CBDA is extracted from the plant substrate and carried to the aqueous liquid. More precisely, during the extraction step (at least) CBDA is extracted from the plant substrate and carried to the aqueous liquid.

Advantageously but not necessarily, during the extraction step at least the following cannabinoids are extracted from the plant substrate and carried to the aqueous liquid: CBDA, THCA, CBGA, CBCA, CBDVA e THCVA.

In particular, during the extraction step at least the following cannabinoids: CBDA, THCA, CBGVA, CBGA, CBCA, CBDVA, THCVA, CBNA and CBVA are extracted from the plant substrate and carried to the aqueous liquid.

According to some non-limiting embodiments, during the extraction step, the (or part of the) acid cannabinoids identified in L. O. Hanus, S. M. Meyer, E. Munoz, O. Taglialatela-Scafati, G. Appendino, Phytocannabinoids: A unified critical inventory, Natural Product Reports, 2016, 33(12), 1357-1392 are extracted.

In particular, the acid cannabinoid comprises at least CBDA and/or THCA. More in particular, the acid cannabinoid is chosen from the group consisting of: CBDA, THCA and a combination thereof (namely, a mixture thereof).

According to specific non-limiting embodiments, the acid cannabinoid comprises (more in particular, is) CBDA. In other words, in some non-limiting cases, during the extraction step (at least) the CBDA is extracted from the plant substrate and carried (solubilized) to the aqueous liquid.

In some non-limiting cases, the complexing component is a single cyclodextrin. Alternatively, the complexing component is a mixture of cyclodextrins.

According to some non-limiting embodiments, the complexing component comprises (in particular, is) at least one cyclodextrin chosen from the group consisting of: α-cyclodextrin, β-cyclodextrin, γ-cyclodextrin, derivatives thereof (namely derivatives of α-cyclodextrin, β-cyclodextrin and γ-cyclodextrin) and a combination thereof (i.e. a mixture thereof).

The CDs (cyclodextrins) are oligosaccharides that form spontaneously from the degradation of starch. In particular, they consist of six (α-CD), seven (β-CD) or eight (γ-CD) units of glucose joined by α-1,4-glycosidic bonds and close to form a ring. The three-dimensional structure of the CDs is a truncated cone, which encloses a cavity having different volume based on the type of CD, namely the number of glucose units making up the CD.

Advantageously but not necessarily, the cyclodextrin comprises (is) an alkylated cyclodextrin (in particular methylated). According to some non-limiting embodiments, the cyclodextrin is a randomly alkylated (in particular methylated) cyclodextrin.

In other words, the complexing component comprises at least one alkylated (in particular methylated) cyclodextrin. According to some non-limiting embodiments, the complexing component comprises at least one randomly alkylated (in particular methylated) cyclodextrin.

The alkylated cyclodextrins have experimentally shown that they further improve the solubility of the cannabinoids.

Advantageously but not necessarily, the cyclodextrin is chosen from β-cyclodextrin and derivatives thereof (in particular alkylated) (and, if necessary, a mixture thereof). According to specific non-limiting embodiments, the cyclodextrin comprises HP-β-cyclodextrin (2-hydroxypropyl-β-cyclodextrin—CAS no. 128446-35-5) or derivatives thereof. More precisely, the cyclodextrin is HP-β-cyclodextrin and/or β-cyclodextrin. Even more precisely, the cyclodextrin is HP-β-cyclodextrin.

The different cyclodextrins have different solubility in water (different saturation concentration).

Table 1 shows the solubility of some cyclodextrins [T. Loftsson et al, Cyclodextrins in drug delivery, Expert Opin. Drug Deliv., 2005, 2(2), 335-351].

TABLE 1

| Cyclodextrin | Solubility in pure water (mg/ml) at approx. 25° C. |
|---|---|
| α-Cyclodextrin | 145 |
| β-Cyclodextrin (βCD) | 18.5 |
| 2-Hydroxypropyl-β-cyclodextrin | >600 |
| Randomly methylated β-Cyclodextrin | >500 |
| Sodium salt of β-CD sulfobutyl ether | >500 |
| γ-Cyclodextrin | 232 |
| 2-Hydroxypropyl-γ-cyclodextrin | >500 |

According to specific non-limiting embodiments, the complexing component comprises (in particular is) a cyclodextrin chosen from β-cyclodextrin and derivatives thereof (in particular alkylated). More precisely, the complexing component comprises (in particular is) HP-β-cyclodextrin and/or β-cyclodextrin. Even more precisely, the complexing component comprises (in particular is) HP-β-cyclodextrin.

It has been experimentally observed that the β-cyclodextrins are less toxic than the α-cyclodextrins and have greater complexing capacities than the γ-cyclodextrins.

Advantageously but not necessarily, the aqueous liquid comprises at least 50% (in particular, at least 70%) by weight, relative to the total weight of the aqueous liquid, of water.

According to some non-limiting embodiments, the aqueous liquid comprises at least 80% (in particular, at least 95%; more in particular, at least 99%) by weight, relative to the total weight of the aqueous liquid, of water. In particular, the aqueous liquid comprises up to 99.9% by weight, relative to the total weight of the aqueous liquid, of water.

In particular, the aqueous liquid consists of water and the complexing component.

Advantageously but not necessarily (in particular if the cyclodextrin is HP-β-cyclodextrin), the aqueous liquid comprises up to 600 mg (in particular, up to 500 mg; more in particular, up to 250 mg; even more in particular, up to 50 mg; even more in particular, up to 25 mg) of the complexing component for each mL of liquid.

More precisely, the aqueous liquid contains the cyclodextrin up to its saturation concentration (of the cyclodextrin).

Alternatively or additionally, the aqueous liquid comprises at least 0.1 mg (in particular, at least 0.5 mg; more in particular, at least 1 mg) of the complexing component for each mL of aqueous liquid.

Advantageously but not necessarily, the extraction step is carried out below 40° C., in particular above 10° C. (more in particular above 5° C.).

In this way some cannabinoids (e.g. the acid cannabinoids) are degraded less.

According to some non-limiting embodiments, the extraction step is carried out above 40° C. (in particular, above 60° C.), in particular below 115° C. (in particular, below 110° C.).

In this way it is possible to increase the extraction speed.

Advantageously but not necessarily, the plant substrate comprises (in particular, is) at least one part of *Cannabis sativa* L. In particular, the plant substrate comprises (more precisely is) at least (part of) an inflorescence and/or (of) a leaf of *Cannabis sativa* L. In particular, the plant substrate comprises (more precisely is) at least (part of) an inflorescence of *Cannabis sativa* L.

In accordance with a second aspect of the present invention, a composition (in particular, obtained by means of the method described above) is provided comprising at least 40% by weight, relative to the total weight of the composition, of water, a complexing component and at least an acid (carboxylated) cannabinoid. The complexing component comprises (in particular, is) at least a cyclodextrin. It is to be noted that in this composition the acid cannabinoid has proved to be particularly stable.

In some non-limiting cases, the acid cannabinoid is a single acid cannabinoid. Alternatively (and preferably), the acid cannabinoid is a mixture of acid cannabinoids.

In particular, the cannabinoid is one or more phytocannabinoids (having a terpenophenolic molecular structure).

In some non-limiting cases, the cyclodextrin is a single cyclodextrin. Alternatively, the cyclodextrin is a mixture of cyclodextrins.

In other words, in some cases, the complexing component is a single cyclodextrin. Alternatively, the complexing component is a mixture of cyclodextrins.

According to some non-limiting embodiments, the complexing component is chosen from the group consisting of: α-cyclodextrin, β-cyclodextrin, γ-cyclodextrin (derivatives thereof) and a combination thereof.

In particular, the complexing component comprises a compound chosen from β-cyclodextrin and derivatives thereof; for example, the complexing component comprises HP-β-cyclodextrin.

Advantageously but not necessarily (in particular if the complexing component—in particular, the cyclodextrin—is HP-β-cyclodextrin), the liquid comprises up to 600 mg (in particular, up to 500 mg; more in particular, up to 250 mg; even more in particular, up to 50 mg; even more in particular, up to 25 mg) of the complexing component for each mL of liquid.

Alternatively or additionally, the composition comprises at least 0.1 mg (in particular, at least 0.5 mg; more in particular, at least 1 mg) of the complexing component for each mL of composition.

Advantageously but not necessarily, the composition comprises at least 50% (in particular, at least 70%) by weight, relative to the total weight of the composition, of water.

According to some non-limiting embodiments, the composition comprises at least 80% (in particular, at least 95%; more in particular, at least 99%) by weight, relative to the total weight of the composition, of water. In particular, the aqueous liquid comprises up to 99.9% by weight, relative to the total weight of the composition, of water.

In particular, the aqueous liquid consists of water and the complexing component.

Advantageously but not necessarily, the composition comprises at least approximately 0.05% (in particular, at least approximately 0.1%; more in particular, at least approximately 0.5%; even more in particular, at least approximately 1%) by weight, relative to the total weight of the composition, of the acid cannabinoid. In some non-limiting cases, the composition comprises up to approximately 15% (in particular, up to 10%; more in particular, up to 5%) by weight, relative to the total weight of the composition, of the acid cannabinoid.

Advantageously but not necessarily, the complexing component is defined as indicated above (relative to the first aspect of the invention).

Advantageously but not necessarily, the acid cannabinoid comprises at least one of (is chosen from the group consisting of): CBDA, THCA, CBGVA, CBGA, CBCA, CBDVA, THCVA, Delta-8-THCA, CBNA, CBVA (and a combination thereof—i.e. a mixture thereof).

In particular, the acid cannabinoid comprises at least one of (is chosen from the group consisting of): CBDA, THCA, CBGVA, CBGA, CBCA, CBDVA, THCVA, CBNA, CBVA (and a combination thereof—i.e. a mixture thereof). According to some non-limiting embodiments, the acid cannabinoid comprises at least one of (is chosen from the group consisting of): CBDA, THCA, CBGA, CBCA, CBDVA, THCVA and a combination thereof (and a combination thereof—i.e. a mixture thereof).

In particular, the acid cannabinoid is chosen from the acid cannabinoids identified in L. O. Hanus, S. M. Meyer, E. Munoz, O. Taglialatela-Scafati, G. Appendino, Phytocannabinoids: A unified critical inventory, Natural Product Reports, 2016, 33(12), 1357-1392.

In particular, the acid cannabinoid comprises at least one of (is chosen from the group consisting of): CBDA, THCA, CBGA (and a combination thereof). More in particular, the acid cannabinoid comprises at least one of (is chosen from the group consisting of): CBDA, THCA (and a combination thereof).

According to specific non-limiting embodiments, the acid cannabinoid comprises (is) CBDA.

It is to be noted that it is particularly difficult for the acid cannabinoids (e.g. CBDA—being substantially ionic) to reach the brain and therefore to have a psychotropic effect.

In any case, for example, is has been experimentally shown that the CBDA has non-negligible pharmacological properties (in particular, analgesic and/or anti-inflammatory).

Advantageously but not necessarily, the composition (the acid cannabinoid) comprises (is) CBDA, THCA, CBGA, CBCA, CBDVA and THCVA.

In particular, the composition (the acid cannabinoid) comprises (is) CBDA, THCA, CBGA, CBCA, CBDVA, CBNA and THCVA.

More in particular, the composition (the acid cannabinoid) comprises (is) CBDA, THCA, CBGVA, CBGA, CBCA, CBDVA, THCVA, CBNA, CBVA.

In some non-limiting cases, the composition further comprises CBD, THC, CBG, CBC, CBDV and THCV.

In particular, the composition further comprises CBD, THC, CBG, CBC, CBDV, THCV, CBV, CBGV.

According to some non-limiting embodiments, the composition comprises (the acid cannabinoid is) the mixture of the acid cannabinoids identified in L. O. Hanus, S. M. Meyer, E. Munoz, O. Taglialatela-Scafati, G. Appendino, Phytocannabinoids: A unified critical inventory, Natural Product Reports, 2016, 33(12), 1357-1392.

According to some non-limiting embodiments, the composition comprises (the acid cannabinoid is) the mixture of the acid cannabinoids identified in L. O. Hanus, S. M. Meyer, E. Munoz, O. Taglialatela-Scafati, G. Appendino, Phytocannabinoids: A unified critical inventory, Natural Product Reports, 2016, 33(12), 1357-1392.

According to some non-limiting embodiments, the composition consists of an aqueous solution of at least one acid cannabinoid, a non-acid cannabinoid or a mixture of acid and non-acid cannabinoids. Said solution can consist of the extraction solution described previously (as is or diluted or concentrated) to which various additives can be added (dyes, sweeteners, flavors, etc.). The solution can also be obtained by solubilization in water of the dry residue obtained by extraction as reported above. In this case, the additives can be solubilized in the water before, after or simultaneously with solubilization of the dry residue.

Advantageously but not necessarily, the molar ratio between the cyclodextrin present in the composition and the sum of the cannabinoids present in the composition ranges from 0.5 to 2.

According to some non-limiting embodiments, the molar ratio between the cyclodextrin present in the composition and the sum of given cannabinoids present in the composition ranges from 0.5 to 2; said given cannabinoids are: CBD (cannabidiol), THC (tetrahydrocannabinol), CBDA (cannabidiolic acid), THCA (tetrahydrocannabinolic acid), CBG (cannabigerol), CBGA (cannabigerolic acid), CBC (cannabichromene), CBCA (cannabichromenic acid), CBDV (cannabidivarin), THCV (tetrahydrocannabidivarin), CBDVA (cannabidivarinic acid), THCVA (tetrahydrocannabidivarinic acid), CBDB (cannabidibutol) and CBDBA (cannabidibutol acid). It is to be noted that it is not necessary for all the cited cannabinoids to be present in the composition. It is sufficient for one or more of these cannabinoids to be present; it is the sum of the moles of the cannabinoids in the above list present in the composition which, in these cases, is considered for determination of the mentioned molar ratio.

In accordance with a third aspect of the present invention, the use of the composition in accordance with the second aspect of the present invention is provided for cosmetic treatment (in particular, of the human body).

According to some embodiments, the use provides for a topical application (more precisely, on the skin) of the composition.

More precisely, the use of the composition is for the cosmetic treatment of at least a part of the human body. The use comprises an application step, during which the composition is applied to said part.

Additionally or alternatively, in accordance with a fourth aspect of the present invention, the use of a composition in accordance with the second aspect of the present invention is provided as a lenitive, in particular as a lenitive (of at least a part) of the human body.

In accordance with a fifth aspect of the present invention, the composition is provided in accordance with the second aspect of the present invention for use as a medicament (as a drug; pharmacological use). In particular, the cited composition is provided for use in the treatment of an inflammation.

According to some non-limiting embodiments, the cited composition is provided for a use chosen from the group consisting of: analgesic, anti-inflammatory, anticonvulsant, antioxidant and a combination thereof. In particular, the cited composition is provided for a use chosen from the group consisting of: analgesic, anti-inflammatory and a combination thereof.

In some non-limiting cases, the use provides for a topical application (on the skin) of the composition and/or oral administration. For example, in these cases, according to some variations, the composition is in aqueous liquid form (solution, syrup, drops, etc.) or solid form (tablets, pills, capsules, etc.).

According to some non-limiting embodiments, the composition in accordance with the second aspect of the present invention is provided for the treatment of at least one of the following: arthritis, multiple sclerosis, epilepsy, neuropathic pain, sleep disorders, inappetence (in patients with HIV/AIDS), nausea and vomiting (due to chemotherapy) and a combination thereof.

In accordance with a further aspect of the present invention, a use of the composition is provided in accordance with the second aspect of the present invention as a food product (and/or nutraceutical and/or food supplement).

Unless explicitly indicated otherwise, the content of the references (articles, books, patent applications etc.) cited in this text is herein recalled in full. In particular, the mentioned references are herein incorporated by reference.

Further characteristics of the present invention will become clear from the following description of some merely illustrative and non-limiting examples.

Example 1

CBDA and CBD Extraction with HP-β-CD from Inflorescence of Fiber-Type CS at Ambient Temperature Portions of 500 mg of inflorescence (with CBDA and CBD content of 2.66% and 0.18% weight/weight respectively) were incubated separately for 2 hours at ambient temperature with 50 mL of water in the presence of different concentrations of HP-β-CD. The specific example reports the experiments conducted with 0, 60, 130, 250, 500 and 1000 mg of CD. The extraction was set up in a beaker. Table 2 shows the weight/weight percentage titer of two of the cannabinoids examined, specifically CBDA and CBD, with reference to the real titer calculated after extraction according to German Pharmacopoeia of *Cannabis* Flos.

The official method reported in the German Pharmacopoeia of *Cannabis* Flos (https://www.MonographCannabis-Flos.pdf) comprises three extraction and filtering cycles of 500 mg of inflorescence with 20, 12.5 and 12.5 mL of ethanol 96% respectively. The ethanol liquid phase was brought to a volume of 50 mL in a volumetric flask with clean 96% ethanol. Said extract was filtered on a regenerated cellulose filter with pore diameter 0.45 μm. A 1 mL portion was diluted with 9 mL of 96% ethanol for chromatographic analysis. For each cannabinoid a calibration curve was constructed for the quantification thereof within the extracts and in the aqueous formulations of the inclusion complexes with the inflorescence. The calibration curve was constructed with certified standards (Cerilliant Cannabinoid Reference Standards, Cerilliant Corporation, Texas, USA) in a concentration range of 0.25-1.00 μg/mL. The titrations were performed following the method published by Citti et al. [Citti et al., Journal of Pharmaceutical and Biomedical Analysis 2016, 128, 201-209] with the use of high-performance liquid chromatography coupled with a UV detector (HPLC-UV).

In this example a variety of fiber-type CS called "Eletta campana" was used. For said variety the real titer of CBDA was 2.66% (weight/weight) and CBD of 0.18% (weight/weight). The percentage extraction yield is indicated between brackets in Table 2. As can be seen from the table, the yield is total (also higher than the one obtained by carrying out the extraction in accordance with the German Pharmacopoeia) using 1000 mg of HP-β-CD with 500 mg of inflorescence of CS in 50 mL of water. It was certainly not a foregone conclusion that the aqueous solutions used would have been able to extract (and not only solubilize) the cannabinoids.

TABLE 2

| HP-β-CD (mg) | CBDA % (% yield) | CBD % (% yield) |
|---|---|---|
| 0 | 0.75 (28) | 0.04 (22) |
| 60 | 1.31 (49) | 0.05 (25) |
| 130 | 1.84 (69) | 0.07 (39) |
| 250 | 2.32 (87) | 0.12 (67) |
| 500 | 2.38 (89) | 0.15 (83) |
| 1000 | 2.78 (104) | 0.20 (111) |

It is furthermore observed that part of what is obtained from the extraction was subsequently dried (by evaporation of the water) so as to obtain a water-soluble powder.

Example 2

CBDA and CBD Extraction with HP-β-CD from Inflorescence of Fiber-Type CS at 100° C.

Two 250 mg portions of inflorescence of Eletta Campana variety (with CBDA and CBD content 2.66% and 0.18% weight/weight respectively) were incubated separately for 1 hour with 25 mL of water in the absence of and in the presence of 250 mg of HP-β-CD. The extraction was set up in a flask immersed in silicone oil under magnetic stirring and in the presence of a bubble condenser. The temperature was set to 100° C. Table 3 shows the weight/weight percentage titer of two of the cannabinoids examined, specifically CBDA and CBD, with reference to the real titer calculated after extraction according to German Pharmacopoeia of *Cannabis* Flos. The real titer of CBDA was 2.66% (w/w) and of CBD 0.18% (w/w) as for example 1 given above. The percentage extraction yield is indicated between brackets in Table 3. As can be seen, over time the percentage yield of CBD exceeds 100%. This is due to the process of conversion of the CBDA into CBD by decarboxylation triggered by the temperature. Furthermore, once formed, the inclusion complex stabilizes the acid cannabinoids, limiting the conversion thereof (by decarboxylation) into the corresponding neutral derivatives despite the application of a high temperature.

TABLE 3

| | CBDA % (% yield) | | CBD % (% yield) | |
|---|---|---|---|---|
| Time (min) | Without HP-β-CD | With HP-β-CD | Without HP-β-CD | With HP-β-CD |
| 15 | 0.80 (30) | 1.90 (71) | 0.14 (76) | 0.17 (93) |
| 30 | 0.59 (22) | 1.97 (74) | 0.19 (107) | 0.17 (92) |
| 45 | 0.58 (22) | 1.97 (74) | 0.28 (153) | 0.24 (136) |
| 60 | 0.57 (21) | 1.92 (72) | 0.31 (172) | 0.27 (150) |

Example 3

Stability of CBDA and CBD in Inclusion Complexes of Inflorescence of Eletta Campana Fiber-Type CS and HP-β-CD at 25° C. and at 8° C.

Two portions, each of 500 mg of inflorescence of CS (with CBDA and CBD content of 2.66% and 0.18% w/w respectively), were placed in 50 mL of water in the presence of 500 mg of HP-β-CD under magnetic stirring at ambient temperature for 1 hour in two separate beakers. After filtering, both the solutions were then transferred to an amber-colored closed container. One container was kept at ambient temperature (25° C.) in the dark and the other in the refrigerator at 8° C. The concentration of the cannabinoids, in the particular example of CBDA and CBD, was measured at different times to verify the stability thereof, analyzing a portion by HPLC-UV. Table 4 shows the cannabinoid concentrations at different times from 0 to 100 days of conservation. The percentage CBDA concentration difference with reference to time 0 is indicated in brackets. It can be seen that at ambient temperature there is a loss (albeit very slow—especially when compared with the methodology currently used) of CBDA over time, whereas both CBDA and CBD remain surprisingly stable also for 100 days if the formulation is kept at 8° C.

According to studies conducted (known art) on the infusion obtained from inflorescence of CS (therefore, in the absence of CD), the concentrations of CBD in water at 25° C. drop by 60% over a period of 7 days, whereas if the tisane is kept at 4° C., the drop is 50% in the same time period. As regards the CBDA, its stability in water both at 25° C. and at 4° C. is not guaranteed beyond 14 days [R. Pacifici et al., Clinical Chemistry and Laboratory Medicine, 2017, 55(10), 1555-1563].

TABLE 4

| Time | CBDA (µg/mL) | | CBD (µg/mL) | |
|---|---|---|---|---|
| (days) | 25° C. | 8° C. | 25° C. | 8° C. |
| 0 | 6.45 | 6.81 | 0.14 | 0.16 |
| 14 | 5.81 (−9.9%) | 6.94 (+1.8%) | 0.56 | 0.12 |
| 45 | 4.47 (−30.7%) | 6.91 (+1.4%) | 0.78 | 0.17 |
| 60 | 3.38 (−47.6%) | 6.86 (+0.6%) | 1.10 | 0.14 |
| 100 | 3.21 (−50.1%) | 6.91 (+1.4%) | 2.93 | 0.17 |

As can be noted (especially looking at the results obtained with conservation at 25° C.), the CBD concentration tends, in some conditions, to increase over time. This depends on the fact that at least part of the CBDA degrades to CBD by decarboxylating.

From the description and examples given above, the advantages of the present invention are evident. In fact, it has been observed that the compositions obtained show a stability surprisingly and significantly higher than that shown by both the aqueous and oily formulations reported so far in literature. The oily and aqueous formulations based on inflorescence of CS reported in the literature guarantee the stability of the cannabinoids, and in particular of acid cannabinoids, within them only in the very short term, namely a period of a few days [Citti et al., Journal of Pharmaceutical and Biomedical Analysis 2016, 128, 201-209; R. Pacifici et al., Clinical Chemistry and Laboratory Medicine 2017, 55(10), 1555-1563]. Furthermore, the extraction yield according to the present invention is maximum in water at ambient temperature after only 1 or 2 hours of stirring.

The invention claimed is:

1. A method for extracting at least one cannabinoid comprising a cannabidiolic acid from a plant substrate carried out by human and/or by technology and comprising an extraction step, during which the plant substrate is caused to come into contact with an aqueous liquid so that the at least one cannabinoid is extracted from the plant substrate and carried to the aqueous liquid; the aqueous liquid comprising at least 40% by weight, relative to the total weight of the aqueous liquid, of water and at least one complexing component; the complexing component is at least one cyclodextrin; the plant substrate comprises at least one part of an inflorescence and/or of a leaf of *Cannabis sativa* L.

2. The extraction method according to claim 1, wherein the plant substrate comprises an inflorescence of *Cannabis sativa* L.; and the aqueous liquid comprises at least 0.1 mg of the complexing component for each mL of aqueous liquid.

3. The extraction method according to claim 1, wherein the aqueous liquid comprises at least 50% by weight, relative to the total weight of the aqueous liquid, of water and an amount up to 600 mg of the complexing component for each mL of liquid.

4. The extraction method according to claim 1, wherein the aqueous liquid comprises at least 80% by weight, relative to the total weight of the aqueous liquid, of water and at least 0.1 mg of the complexing component for each mL of aqueous liquid.

5. The extraction method according to claim 1, wherein the complexing component is selected in the group consisting of: α-cyclodextrin, β-cyclodextrin, γ-cyclodextrin, derivatives thereof, and a combination thereof.

6. The extraction method according to claim 1, wherein the complexing component comprises a compound chosen from β-cyclodextrin and one or more derivatives thereof.

7. The extraction method according to claim 1, wherein, during the extraction step, the at least one cannabinoid is extracted and carried to the aqueous liquid, the at least one cannabinoid being chosen from the group consisting of: CBD (cannabidiol), THC (tetrahydrocannabinol), CBDA (cannabidiolic acid), THCA (tetrahydrocannabinolic acid), CBG (cannabigerol), CBGA (cannabigerolic acid), CBC (cannabichromene), CBCA (cannabichromenic acid), CBDV (cannabidivarin), THCV (tetrahydrocannabivarin), CBDVA (cannabidivarinic acid), THCVA (tetrahydrocannabivarinic acid), CBV (cannabivarin), CBVA (cannabivarinic acid), CBNA (cannabinolic acid), CBN (cannabinol), Delta-8-THC (delta-8-THC), Delta-8-THCA (delta-8-THC acid), CBGV (cannabigerovarin), CBGVA (cannabigerovarinic acid), and a combination thereof.

8. The extraction method according to claim 7, wherein the at least one cannabinoid is chosen from the group consisting of: CBDA, THCA, CBGVA, CBGA, CBCA, CBDVA, THCVA, CBNA, CBVA, and a combination thereof.

9. A cannabinoid acid composition comprising: at least 40% by weight, relative to the total weight of the cannabinoid acid composition, of water; a complexing component; and from about 0.05 to about 15% by weight, relative to the total weight of the cannabinoid acid composition, of at least one cannabinoid acid, wherein the complexing component comprises a cyclodextrin.

10. The cannabinoid acid composition according to claim 9, wherein the cannabinoid acid composition has a molar ratio of the cyclodextrin to a sum of cannabinoids present in the cannabinoid acid composition ranging from 0.5 to 2.

11. The cannabinoid acid composition according to claim 9, wherein the cannabinoid acid composition has a molar ratio of the cyclodextrin to a sum of cannabinoids present in the cannabinoid acid composition ranging from 0.5 to 2; wherein the sum of cannabinoids are comprises: CBD (cannabidiol), THC (tetrahydrocannabinol), CBDA (cannabidiolic acid), THCA (tetrahydrocannabinolic acid), CBG (cannabigerol), CBGA (cannabigerolic acid), CBC (cannabichromene), CBCA (cannabichromenic acid), CBDV (cannabidivarin), THCV (tetrahydrocannabidivarin), CBDVA (cannabidivarinic acid), THCVA (tetrahydrocannabidivarinic acid), CBDB (cannabidibutol), and CBDBA (cannabidibutol acid).

12. The cannabinoid acid composition according to claim 9, comprising at least 0.1 mg of the complexing component for each mL of the cannabinoid acid composition and at least 0.05% by weight, relative to the total weight of the cannabinoid acid composition, of the cannabinoid acid.

13. The cannabinoid acid composition according to claim 9, wherein the cannabinoid acid comprises CBDA, THCA, CBGVA, CBGA, CBCA, CBDVA, THCVA, Delta-8-THCA, CBNA, CBVA, or a combination thereof.

14. The cannabinoid acid composition according to claim 9, wherein the cannabinoid acid comprises CBDA.

15. The cannabinoid acid composition according to claim 9 obtained by means of an extraction method comprising an extraction step, during which a plant substrate is caused to come into contact with an aqueous liquid so that at least one cannabinoid comprising the cannabinoid acid composition is extracted from the plant substrate and carried to the aqueous liquid; the aqueous liquid comprising at least 40% by weight, relative to the total weight of the aqueous liquid, of water and the complexing component comprising the cyclodextrin.

16. A nutraceutical product comprising the cannabinoid acid composition according to claim 9.

17. A method of cosmetic treatment for at least one part of a human body, the method comprising applying the cannabinoid acid composition according to claim 9 to the at least one part of the human body.

18. A food composition comprising the cannabinoid acid composition according to claim 9.

19. A method for providing analgesic, anti-inflammatory, anticonvulsant, antioxidant function comprising administering the cannabinoid acid composition according to claim 9 to a human.

20. A drug comprising the cannabinoid acid composition according to claim 9.

21. A method for the treatment of inflammation, the method comprising: administering the cannabinoid acid composition according to claim 9 to a human.

* * * * *